UNITED STATES PATENT OFFICE.

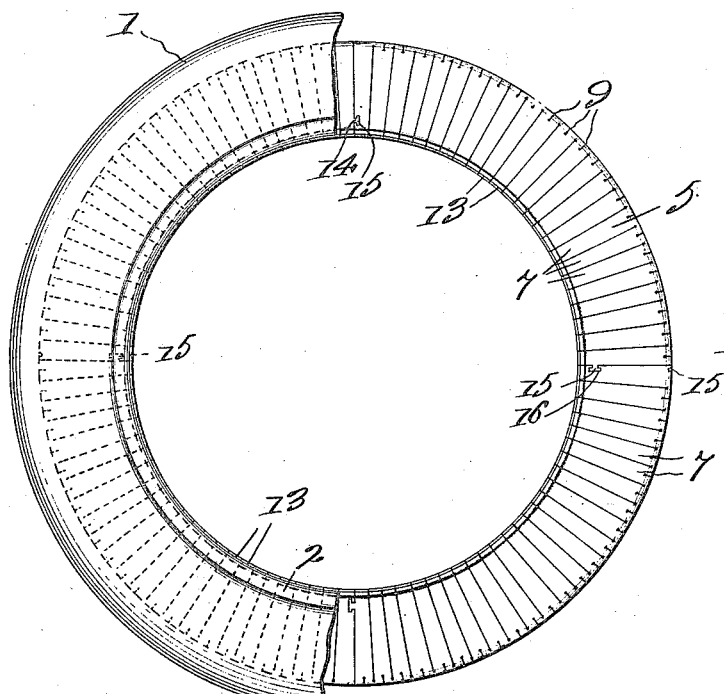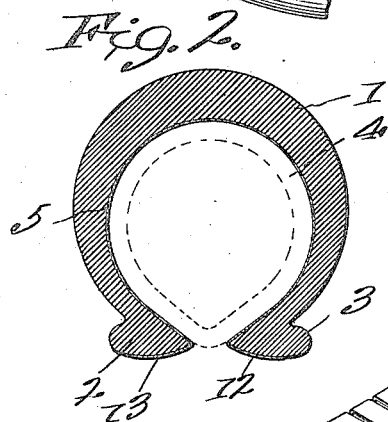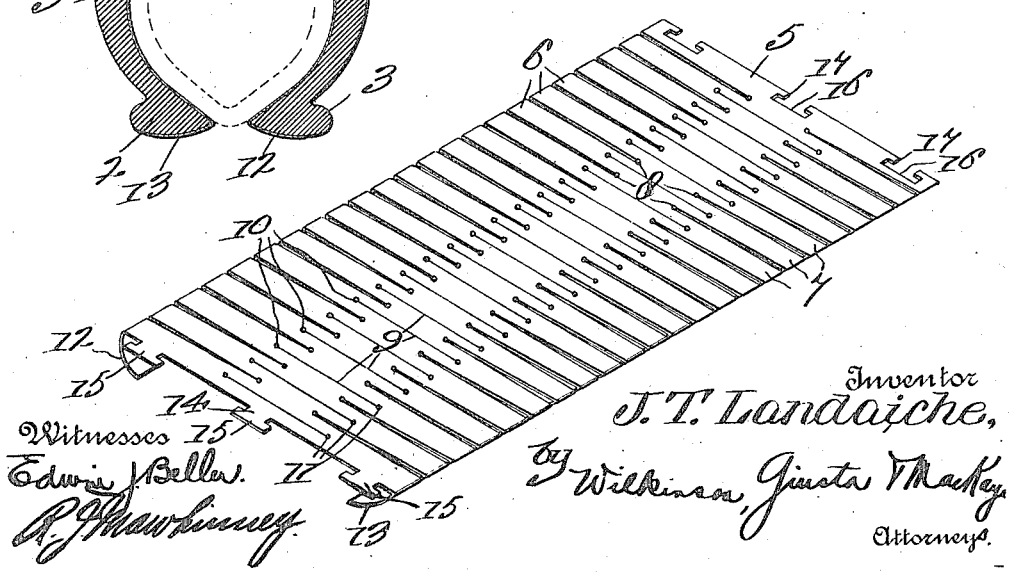

JOSEPH THOMAS LANDAICHE, OF REMY, LOUISIANA.

TIRE-PROTECTOR.

1,192,648.  Specification of Letters Patent.  Patented July 25, 1916.

Application filed January 21, 1916. Serial No. 73,314.

*To all whom it may concern:*

Be it known that I, JOSEPH T. LANDAICHE, a citizen of the United States, residing at Remy, in the parish of St. James and State of Louisiana, have invented certain new and useful Improvements in Tire-Protectors; and I do hereby declare the following to be a full, clear, and exact description of the invention, such as will enable others skilled in the art to which it appertains to make and use the same.

The present invention relates to improvements in tire protectors, and consists more particularly in a puncture and blow-out proof steel protector.

It is an object of the present invention to provide an improved tire protector of the above indicated character, which will comprise a plurality of metallic sections provided with interlocking means for securing said sections together to form a continuous and circular sheath for fitting within the ordinary outer casing shoe of an automobile tire.

Another object of the present invention resides in providing an improved tire protector which will be fitted within the tire shoe and operate as a protection for the inner tube, which is, in turn, fitted therein and which will comprise a plurality of sheets of highly tempered steel cut along its edges with slots to permit the same to be bent into circular form and readily inserted within the shoe, and also with tabs or engaging beads of the shoe and fitting between the same and the rim for securely holding the device in position.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a side elevational view, partly broken away, of a tire shown equipped with a tire protector constructed in accordance with the present invention. Fig. 2 is a cross sectional view of the same; and Fig. 3 is a perspective view of one section of the improved protector.

Referring more particularly to the drawings, wherein one embodiment of the present invention is illustrated, 1 designates the outer casing or shoe of the usual automobile or other vehicle tire, the same having beads 2 and 3 which, as is well known, are engaged by the rim to secure the tire to the vehicle wheel.

4 designates the inner tube, which is also of the usual construction, and is fitted within the shoe 1.

The improved protector preferably consists of a plurality of sections 5, one of which is shown in Fig. 3; and each section is cut along its edges with V-shaped or triangular slots 6 and 7, extending well into the center of the section and terminating at the apexes in perforations 8.

Each slot of both series of slots 6 and 7 is arranged preferably opposite to the corresponding slot of the opposed series, as will be clear from Fig. 3; and between each said pair of opposed slots are incisions or slits 9 made transversely of the sections 5 and extended to overlap the slots 6 and 7, terminating at their ends in perforations 10 and 11. The incisions 9 increase the flexibility of the protector or sheath and permit the steel to be readily inserted within the shoe 1, as illustrated in Figs. 1 and 2, and retained therein without buckling.

The longitudinal edges of each section 5 are formed with series of tabs 12 and 13 adapted to engage beneath the beads 2 and 3 of the casing shoe, as illustrated to advantage in Fig. 2, and which, when the tire is mounted on a vehicle wheel, engage the rim thereof and operate to securely hold the device in position.

At one end each section 5 of the protector is provided with one or more locking tongues for engaging corresponding locking grooves in the adjacent end of the next section, and these tongues are preferably three in number, as shown, and consist each of a shank 14 and head 15 on the outer end of and extending on both sides beyond said shank.

At the opposite end of each section 5 are provided the grooves to receive such T-shaped tongues, comprising each a relatively elongated socket 16 for receiving the heads 15 of the tongues and constricted necks 17, which are occupied by the shanks 14 when the sections are assembled.

The improved protector is connected together and mounted within the tire as will be evident from Figs. 1 and 2 of the drawings, where are indicated four sections 5 as uniting to form the complete circular sheath, It will be seen that the series of V-shaped slots 6 and 7 permit the sections 5 to be bent to conform to the shape of the interior wall of the shoe 1, said slots closing when so bent to form an uninterrupted and smooth surface. The incisions 9 permit each section to be bent without likelihood of the metal buckling, and also allow the protector to be inserted easily.

After the protector has been inserted the inner tube is thereupon placed within the protector and shoe, and when inflated will hold the locking devices in position and against accidental displacement. By deflating the inner tube 4 and withdrawing same, the sections may be easily removed and replaced, if desired.

It is obvious that those skilled in the art may vary the details of construction and arrangements of parts without departing from the spirit of my invention, and therefore I do not wish to be limited to such features except as may be required by the claims.

I claim:

1. The combination with a vehicle tire shoe, and an inner tube adapted to be fitted in said shoe, of a tire protector independent of said shoe and tube and adapted for removable mounting between the same, said protector including a sheath having a series of V-shaped slots along both edges of the same, and a series of central incisions alternating with and overlapping the inner ends of said slots, substantially as described.

2. In a device of the character described, the combination of a vehicle tire shoe, and an inflatable inner tube fitted therein, of a tire protector constructionally independent of said shoe and tube and adapted for removable insertion therebetween, said protector comprising a plurality of metallic sections provided with T-shaped grooves in one end thereof, triangular slots in the longitudinal edges thereof and central incisions between and overlapping the inner ends of said slots, tabs projecting from the longitudinal slotted edges of said sections and adapted to engage beneath the tire beads and against the wheel rim, and T-shaped tongues projecting from the opposite end of each section for occupying the grooves in the adjacent section, substantially as described.

In testimony whereof I affix my signature.

JOSEPH THOMAS LANDAICHE.